United States Patent [19]

Kent

[11] 4,402,393
[45] Sep. 6, 1983

[54] CONVEYOR DRIVEN FIXTURES WHICH ARE PRECISELY POSITIONABLE AT WORK STATIONS

[75] Inventor: William C. Kent, Garland, Tex.

[73] Assignee: Western Electric Company, Incorporated, New York, N.Y.

[21] Appl. No.: 305,674

[22] Filed: Sep. 25, 1981

[51] Int. Cl.³ .............................................. B65G 15/64
[52] U.S. Cl. .................................... 198/345; 198/793; 198/648; 198/845
[58] Field of Search ............... 198/345, 793, 851, 853, 198/835, 845, 648

[56] References Cited

U.S. PATENT DOCUMENTS

| | | | |
|---|---|---|---|
| 2,057,950 | 10/1936 | Howison | 198/838 |
| 3,155,242 | 11/1964 | Magliore | 198/345 X |
| 3,476,231 | 11/1969 | Bower | 198/345 |
| 3,596,704 | 8/1971 | Roe | 198/345 X |
| 4,351,637 | 9/1982 | Dixon | 198/835 X |

Primary Examiner—Joseph E. Valenza
Assistant Examiner—Dennis J. Williamson
Attorney, Agent, or Firm—R. P. Miller

[57] ABSTRACT

A conveyor system includes a number of closely spaced pallets (14) having nested pairs of ears (47,48 and 56,57) mounted on chain pins (33). First rollers (37) are mounted on pins (33) to ride between guide walls (38 and 39) and are engaged by a drive sprocket (12) to move the pallets through a number of work stations (16 to 19). Additional horizontal rollers (63, 71 and 72) are rotatably mounted on the pallets (14) to ride on one of the guide walls (30) and a third guide wall (74). A crowder pin device (81,82) is operated to engage a pallet at a work station to thrust the pallet rollers (37) against the wall (38) to fixedly position the pallet at the work station. Further precise positioning is attained by moving a tapered shot pin (84) into a hole (87) formed in the positioned pallet.

4 Claims, 4 Drawing Figures

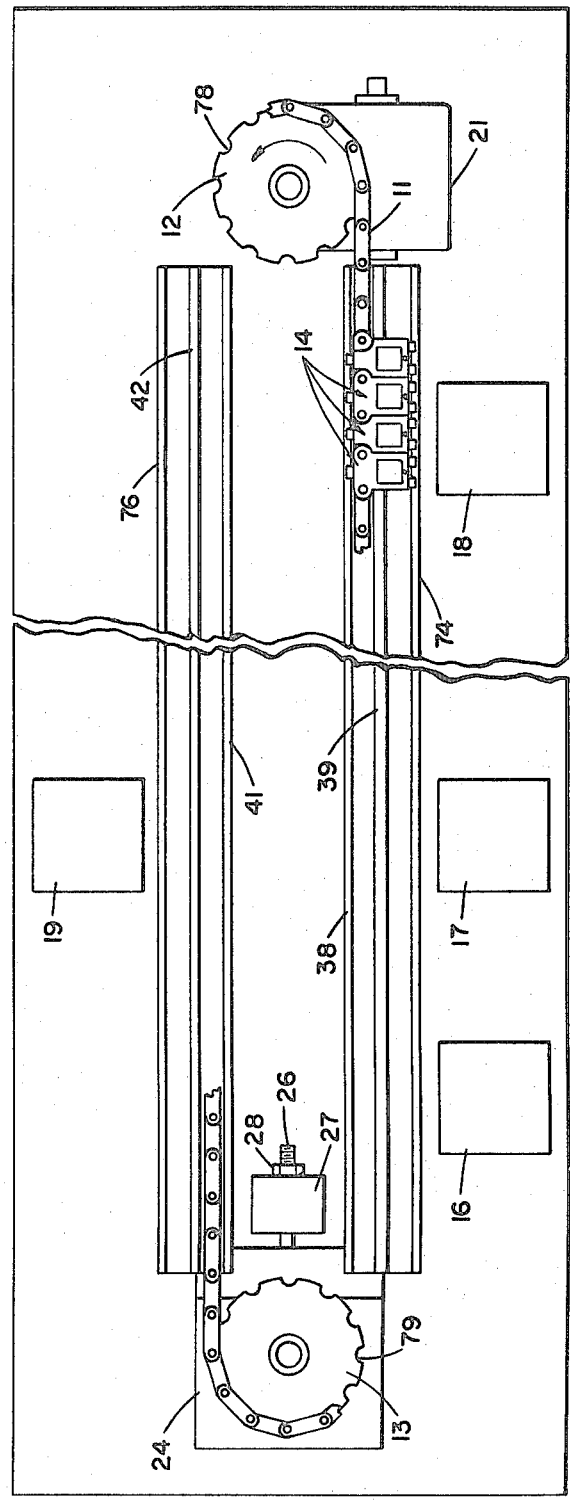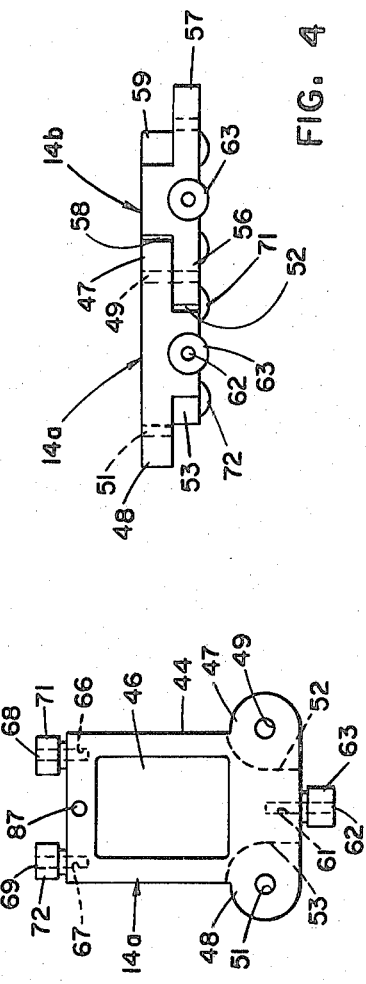

CONVEYOR DRIVEN FIXTURES WHICH ARE PRECISELY POSITIONABLE AT WORK STATIONS

FIELD OF THE INVENTION

This invention relates to chain conveyors for advancing workpieces through a number of work stations and, more particularly, to a chain conveyor for moving closely nested pallets along guideways and positively positioning the pallets at work stations.

BACKGROUND OF THE INVENTION

Heretofore, various types of chain conveyors have been utilized to advance work holding pallets to a number of work stations. One such system is shown in U.S. Pat. No. 4,149,620 issued Apr. 17, 1979, to N. Rosenweig, wherein the links of a chain are fastened to pallets which are adapted to slide along low friction surfaces and through a number of work stations whereat sockets are moved to engate pins extending from the pallets to position each advanced pallet within a work station.

In another similar type of conveyor system, a chain is connected to a number of sub-pallets that slide along ways and which, in turn, are selectively latched to or unlatched from a like number of wheeled pallets which ride along the top surfaces of ways. In systems of this type the pallets are unlatched at a work station and then centered or located with respect to a work performing tool. An example of such a system is shown in U.S. Pat. No. 3,805,942 issued Apr. 23, 1974, to M. J. Auernhammer.

There is still a need for simple, rugged conveyor systems which are adapted to move pallets in a horizontal loop through a number of work assembly or fabricating stations. It is desirable that a system of this type minimize the number of parts to facilitate rugged construction so that the system will require only a minimum amount of maintenance or servicing. Such a system should include facilities for locking the pallets in precise positions during the time that work operations are performed on workpieces carried by or mounted in the pallets.

SUMMARY OF THE INVENTION

This invention contemplates, among other things, a simple rugged chain conveyor wherein chain link pins not only serve to mount the chain links but also serve as bearing mountings for chain guide rollers and mounts for securing pallets to move with the chain. With such a construction, a crowder pin is operated to engage a pallet to force the guide rollers against a supporting surface and, hence, positively locate the pallet in a work station.

More particularly, the invention is concerned with a horizontally driven link chain that is driven through a closed loop to advance a number of pallets through various work stations whereat the pallets are precisely positioned to facilitate work operations on workpieces carried by the pallets. Each pair of conveyor chain links is coupled to two pairs of adjacent links by link pins which also have mounted thereon guide rollers that are adapted to ride between a pair of vertical walls or trackways. In addition, each pair of link pins is constructed to provide extensions that pass through bearing bores formed in a pair of ear-like sections projecting from adjacent corners on each of the pallets. The projecting ear-like sections are cut out to accommodate ear-like projections extending from adjacent pallets.

In addition, a third wall or trackway is provided to run parallel to the other two walls. Rollers are mounted on the front and rear of each pallet to ride on the top of the third trackway and on the top of one of the other trackways. At each work station a crowder rod is moved to engage the pallet and force the chain link rollers against a guideway wall to position the pallet. A precise positioning of each pallet is attained by moving a tapered pilot pin into a hole formed in the pallet.

DESCRIPTION OF THE DRAWINGS

Other features and advantages of the present invention will be apparent upon consideration of the following detailed description when taken in conjunction with the drawings, wherein FIG. 1 is a top plan view of a conveyor system for advancing work holding pallets along trackways and through a number of work stations in accordance with the principles of the present invention;

FIG. 3 is a top view of one of the pallets showing an arrangement of rollers for supporting a pallet together with ear-like projections for mounting the pallet on a conveyor link chain, and FIG. 4 is a front elevational view of a pair of pallets depicting the nested mounting of the ear-like projections on extensions of the chain link pins.

DETAILED DESCRIPTION

Figure 2:
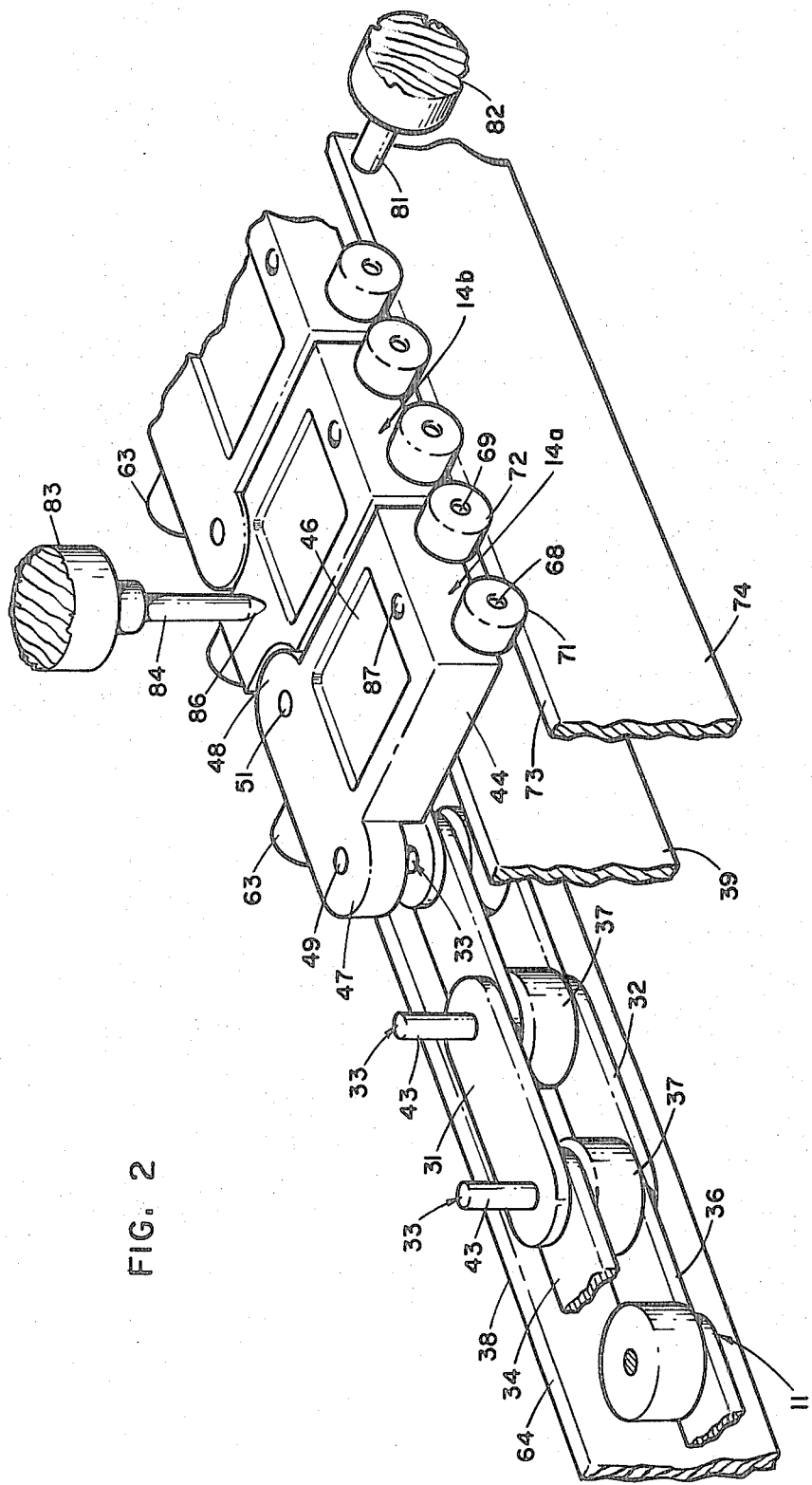
FIG. 2 is a perspective view of a section of the conveyor system particularly illustrating the construction of the pallets and the roller mountings thereon which act to stabilize the movement of the pallets and which are also used with other facilities to precisely position the pallets in the work stations.

Referring first to FIG. 1, there is shown a table frame 10 for supporting a conveyor system which comprises, in general, a link chain 11 driven in a horizontal plane by a drive sprocket 12 to move in a closed path about an idler sprocket 13. Attached to the chain are a number of pallets 14 which are moved through work stations 16, 17, 18 and 19 whereat work operations may be performed. One example of the use of the conveyor system may be in the assembly of a connector wherein component parts may be automatically or manually assembled at stations 16, 17 and 18 and the completed assembly removed at station 19.

Power for driving the sprocket 12 may include a motor 21 that applies rotative power through a commercial torque limiter and speed reducer to apply a controlled rotative force to the sprocket. The idler sprocket 13 is mounted on a frame 24 that is slidably mounted on the top of the table 10. An adjusting screw 26 is threadably mounted in a block 27 secured to the table 10 and may be turned to shift the frame 24 and the sprocket 13 to adjust the tension in the chain to keep the slack in the chain at a minimum. A lock nut 28 is provided to secure the adjustment of the screw 26.

Attention is directed to FIG. 2 for a detailed consideration of the construction of the chain 11 and the pallets 14 attached thereto. The chain comprises first pairs of links 31 and 32 coupled by link pins 33 to second pairs of links 34 and 36. Links 31 and 32 are fixedly secured to a pair of pins 33 while adjacent pairs of links 34 and 36 are rotatably mounted on the pins 33. Each pin 33 provides a mounting for a roller 37 having a diameter which is slightly larger than the width of the chain links so that the peripheries of the rollers may ride between and along the surfaces of a pair of first and second guide walls 38 and 39. These guide walls 38 and 39 are secured to and project from the top surface of the table frame 10 and provide trackway paths running between the sprockets 13 and 12 and through the work stations 16, 17 and 18. Similar walls 41 and 42, see FIG. 1, are provided to run along a third conveyor path running from sprocket 12 to sprocket 13 and through work station 19.

Each of the chain link pins 33 is formed with an extension 43 which provides a mounting for a pallet 14. More specifically, referring to FIGS. 2, 3 and 4, each first pallet 14a comprises a plate-like body 44 with a recess or nest 46 to receive and locate a workpiece. The inner section of each pallet 14a has a pair of projecting arcuate ears 47 and 48 having bearing bores 49 and 51 to receive a pair of chain link pin extensions 33. The lower sections of the ears 47 and 48 are cut out to form arcuate recesses 52 and 53. Alternate pallets 14b are similarly constructed, but in this instance a pair of ears 56 and 57 are formed to project from the lower section of the pallet and, thus, are adapted to be received and nested within the recesses 52 and 53 formed in the ears 47 and 48 projecting from the pallets 14a.

In a like manner, the ears 56 and 57 are provided with upper arcuate cutout sections to provide recesses 58 and 59 to receive and nest the ears 47 and 48 projecting from a pair of adjacent pallets 14a. The arcuate construction of the nested pallet ears and recesses permits the pallets 14a and 14b to be closely spaced and easily rotated relative to each other as the chain is rotated about the sprockets 12 and 13.

Considering now the means for guiding the pallets to move in a horizontal plane, each pallet 14 is provided with an inner blind bore 61 to receive a short axle 62 on which is mounted a first roller 63 that is adapted to ride on a way 64 formed by the top surface of bar-like wall 38. Further, each pallet 14 is formed with a pair of outer blind bores 66 and 67 to receive a pair of axles 68 and 69 on which are mounted a pair of second rollers 71 and 72 which ride on a way 73 provided by a top surface of a third wall 74 which is parallel to the walls 38 and 39. A similar third wall 76 (see FIG. 1) is mounted on the table 10 in parallel relation to the walls 41 and 42 to guide the pallets through the work station 19.

In operation of the conveyor system, rotation of the sprocket 12 moves the chain 11 and, thus, the attached pallets 14 through the work stations with the first rollers 63 and the second rollers 71 and 72 riding on the ways 64 and 73, respectively. The sprockets 12 and 13 are provided with arcuate recesses 78 and 79 of sufficient diameter to accommodate the first guide rollers 37. The chain drive may be controlled to be on an intermittent basis so that the pallets are successively stopped at each work station.

In order to accurately position the stopped pallet at a work station, a crowder pin 81, such as shown in FIG. 2, is operated by an air cylinder 82 to move forward and engage a front face of an aligned pallet. The engaged pallet is pushed toward the wall 64 so that an associate pair of rollers 37 are forced to firmly abut the vertical side surface of the wall 64. To obtain a more precise positioning of a pallet, an air cylinder 83 is operated to drive a shot pin 84 with a conically tapered tip 86 into a bore 87 formed in each pallet.

The conical tip 86 of the shot pin 84 works against the edges of the bore 87 to shift, if necessary, the pallet into the desired precise arcuate location relative to any assembly or fabricating tool that may be located in that particular work station. It will be appreciated that as the rollers are abutted against the wall 64 and the fact that the crowder pin is air driven to frictionally engage the pallet, the shot pin 84 can effectuate a slight shifting of the pallet into the desired precise location.

A second embodiment of the invention contemplates eliminating the links 31, 32 and 34,36, in which case the inner sections of the pallets including the ears 47,48 and 56,57 act as links.

In conclusion, it will be noted that the construction and arrangement of the rollers 37 encompass three functions; namely, the rollers act as positioning means when a pallet 14 is engaged by the crowder pin 84, the rollers act as guides for the chain when the chain is moved between the walls 38 and 39 and, finally, the rollers act to transmit the motion of the sprocket 12 to the chain when the rollers are positioned within the sprocket recesses 78.

What is claimed is:

1. A conveyor system for advancing workpieces, which comprises:
    a plurality of pallets, each having a pair of laterally extending ears which overlay ears on adjacent pallets; each of said ears having a bore therethrough aligned with a bore formed in an ear on an adjacent pallet;
    an axle pin extending through and beyond each of said bores;
    a roller mounted on the extending portion of each of said axles;
    a pair of walls spaced apart a distance sufficient to accommodate said rollers;
    a sprocket having arcuate peripheral recesses for receiving said rollers;
    means for rotating said sprocket to advance said rollers between said walls;
    roller means mounted on and extending horizontally from each of said pallets for riding on the top of a first of said walls;
    a third wall parallel to said pair of walls and having top surfaces to provide a way; and
    second roller means mounted on and extending horizontally from each of said pallets for riding on the way provided on the top of said third wall.

2. A conveyor system as defined in claim 1, which comprises:
    a crowder pin aligned with the path of movement of the pallets; and
    means for moving the crowder pin to engage an aligned pallet and thrust the rollers on the aligned pallet against the side surface of said first wall.

3. A conveyor system, which comprises:
    a chain constructed of pairs of links mounted at opposite ends to individual pins, each alternate first pair of links being fixed to a pair of said pins and each intervening pair of said pins being rotatably mounted on a pair of said pins, each of said pins having mounting sections projecting beyond said pairs of links;
    a first set of pallets, each having a pair of laterally extending first ears, each of said first ears having a bore therethrough to receive one of said pin mounting sections;
    a second set of pallets, each having a pair of laterally extending second ears, each of said second ears overlaying one of said first ears and having a bore therethrough to receive one of said mounting sections;

a first roller mounted on each of said pins between pairs of said links and having a peripheral surface extending beyond the links;

a first wall having a top guide surface and a side guide surface; said wall being positioned to engage the side guide surface with the peripheral surfaces of said first rollers;

a second roller mounted on each of said pallets for riding on the top guide surface of said first wall;

a second wall parallel to and spaced from said wall and having a top guide surface;

a pair of third rollers mounted on each of said pallets and projecting therefrom to ride on the top guide surface of said second wall; and a third wall interposed between the first and second walls and having a side guide surface positioned to engage said first rollers.

4. A conveyor system as defined in claim 3, which includes:

a crowder pin mounted to be moved to engage a pallet and force the first rollers associated with the engaged pallet against the first guide surface of said first wall.

* * * * *